US008855294B2

(12) United States Patent
Madanes et al.

(10) Patent No.: US 8,855,294 B2
(45) Date of Patent: *Oct. 7, 2014

(54) DIALLING PHONE NUMBERS

(75) Inventors: Rodrigo Madanes, London (GB); Kristjan Janson, Tallinn (EE); Julie Mathilde Fournier, London (GB)

(73) Assignee: Skype, Dublin (IE)

( * ) Notice: Subject to any disclaimer, the term of this patent is extended or adjusted under 35 U.S.C. 154(b) by 359 days.

This patent is subject to a terminal disclaimer.

(21) Appl. No.: 13/301,339

(22) Filed: Nov. 21, 2011

(65) Prior Publication Data

US 2012/0128148 A1 May 24, 2012

Related U.S. Application Data

(63) Continuation of application No. 11/415,992, filed on May 2, 2006, now Pat. No. 8,090,092.

(51) Int. Cl.
*H04M 1/00* (2006.01)
*H04M 3/00* (2006.01)
*H04M 1/2745* (2006.01)

(52) U.S. Cl.
CPC ............... *H04M 1/274566* (2013.01)
USPC ................. 379/355.08; 379/201.01

(58) Field of Classification Search
USPC ....................... 379/355.08, 201.01
See application file for complete search history.

(56) References Cited

U.S. PATENT DOCUMENTS

| | | | |
|---|---|---|---|
| 5,077,804 A | 12/1991 | Richard | |
| 5,455,858 A | 10/1995 | Lin | |
| 5,917,904 A | 6/1999 | Theis | |
| 6,169,791 B1 | 1/2001 | Pokress | |
| 6,453,024 B1 | 9/2002 | Baker et al. | |
| 6,477,247 B1 | 11/2002 | Burg et al. | |
| 6,928,150 B2 | 8/2005 | Johnston | |
| 7,028,027 B1 | 4/2006 | Zha et al. | |
| 7,162,025 B2 | 1/2007 | Schnurr | |
| 7,212,626 B1 | 5/2007 | Kobayashi | |
| 7,317,919 B1 | 1/2008 | Ruf | |
| 7,747,265 B1 | 6/2010 | Ruf | |

(Continued)

FOREIGN PATENT DOCUMENTS

| | | |
|---|---|---|
| WO | WO 2005/008524 A1 | 1/2005 |
| WO | WO 2005/009019 | 1/2005 |
| WO | WO 2005/009019 A3 | 1/2005 |
| WO | WO-2010127992 | 11/2010 |

OTHER PUBLICATIONS

Notification of Transmittal of the International Search Report and Written Opinion of the International Searching Authority, or the Declaration, PCT/EP2010/055832, Mailing Date: Jul. 26, 2010, 11 pages.
"Advisory Action", U.S. Appl. No. 11/415,992, (Feb. 24, 2011), 2 pages.
"Advisory Action", U.S. Appl. No. 12/584,987, (Dec. 15, 2011), 2 pages.

(Continued)

*Primary Examiner* — Quynh Nguyen
(74) *Attorney, Agent, or Firm* — Sonia Cooper; Jim Ross; Micky Minhas

(57) ABSTRACT

Method and apparatus for effecting a voice communication between user terminals connected via a communication network include displaying a menu of country options to a user and receiving a number in local form. Formatting rules are recalled for a destination country selected by the user from the country options. A country prefix for the destination country is prepended to the number in accordance with the formatting rules to generate a formatted number. The formatted number is supplied to a client installed at the user terminal for effecting the voice communication using the formatted number.

20 Claims, 9 Drawing Sheets

(56) References Cited

U.S. PATENT DOCUMENTS

| | | |
|---|---|---|
| 8,090,092 B2 | 1/2012 | Madanes et al. |
| 8,635,362 B2 | 1/2014 | Kalmstrom et al. |
| 2002/0129359 A1 | 9/2002 | Lichner |
| 2003/0112932 A1 | 6/2003 | Johnston |
| 2004/0128144 A1 | 7/2004 | Johnson et al. |
| 2004/0214558 A1 | 10/2004 | Chang et al. |
| 2004/0243939 A1 | 12/2004 | Perepa et al. |
| 2004/0266490 A1 | 12/2004 | Silver |
| 2005/0091274 A1 | 4/2005 | Stanford |
| 2005/0097189 A1 | 5/2005 | Kashi |
| 2006/0105790 A1 | 5/2006 | Jin et al. |
| 2006/0224467 A1 | 10/2006 | Walker et al. |
| 2006/0248456 A1 | 11/2006 | Bender et al. |
| 2006/0271457 A1 | 11/2006 | Romain et al. |
| 2007/0005439 A1 | 1/2007 | Sidlo et al. |
| 2007/0274510 A1 | 11/2007 | Kalmstrom |
| 2007/0274512 A1 | 11/2007 | Madanes et al. |
| 2008/0081662 A1 | 4/2008 | Strandell |
| 2008/0298561 A1 | 12/2008 | Hwang et al. |
| 2009/0005122 A1 | 1/2009 | Goldfarb |
| 2009/0010401 A1 | 1/2009 | Zazza |
| 2009/0141709 A1 | 6/2009 | Cho et al. |
| 2009/0161661 A1 | 6/2009 | Scharf et al. |
| 2009/0164632 A1 | 6/2009 | Kumar et al. |
| 2009/0201918 A1 | 8/2009 | Cho et al. |
| 2010/0005426 A1 | 1/2010 | Van et al. |
| 2010/0287301 A1 | 11/2010 | Kalmstrom et al. |
| 2013/0064359 A1 | 3/2013 | Kalmstrom |

OTHER PUBLICATIONS

"Examiners Answer to Appeal Brief", U.S. Appl. No. 11/416,378, (May 10, 2012), 13 pages.

"Final Office Action", U.S. Appl. No. 11/415,992, (Dec. 17, 2010), 12 pages.

"Final Office Action", U.S. Appl. No. 11/416,378, (Feb. 19, 2010), 24 pages.

"Final Office Action", U.S. Appl. No. 12/584,987, (Oct. 12, 2011), 20 pages.

"Non-Final Office Action", U.S. Appl. No. 11/415,992, (Aug. 26, 2010), 9 pages.

"Non-Final Office Action", U.S. Appl. No. 11/415,992, (Apr. 26, 2010), 8 pages.

"Non-Final Office Action", U.S. Appl. No. 11/416,378, (Feb. 2, 2011), 22 pages.

"Non-Final Office Action", U.S. Appl. No. 11/416,378, (Sep. 1, 2009), 22 pages.

"Non-Final Office Action", U.S. Appl. No. 11/416,378, (Nov. 8, 2011), 26 pages.

"Non-Final Office Action", U.S. Appl. No. 12/584,987, (Apr. 28, 2011), 20 pages.

"Notice of Allowance", U.S. Appl. No. 11/415,992, (Sep. 6, 2011), 5 pages.

"Notice of Allowance", U.S. Appl. No. 12/584 987 (Sep. 5, 2013), 20 pages.

"Non-Final Office Action", U.S. Appl. No. 13/414,523, (Oct. 2, 2013), 8 pages.

"Final Office Action", U.S. Appl. No. 13/414,523, May 9, 2014, 9 pages.

| Country | Prefix | Min Area | Max Area | Min Sub | Max Sub | Remove Zero | Country Icon |
|---|---|---|---|---|---|---|---|
| Afghanistan | 93 | 2 | 2 | 5 | 6 | True | ○ |
| Albania | 355 | 1 | 3 | 4 | 6 | True | □ |

FIGURE 11

DIALLING PHONE NUMBERS

RELATED APPLICATION

This application is a continuation of U.S. application Ser. No. 11/415,992, filed May 2, 2006, now U.S. Pat. No. 8,090,092 B2, issued Jan. 3, 2012. The entire teachings of the above application are incorporated herein by reference.

FIELD OF THE INVENTION

The present invention relates to dialing phone numbers, and particularly but not exclusively to assisting a user to dial phone numbers in a correct format. The phrase "phone number" encompasses any numeric or alphanumeric sequences which can be used to instigate a communication between two end users, and in particular includes within its ambit fax numbers.

BACKGROUND OF THE INVENTION

A so-called peer-to-peer telephone system is described in WO2005/009019. In such a system, a plurality of end users can be connected for communication purposes via a communications structure, for example the internet or world wide web. The communications structure is substantially decentralised with regard to communication route switching therein for connecting the end users. That is, the end users can establish their own communication routes through the structure based on exchange of one or more authorisation certificates (user identity certificates—UIC) to acquire access to the structure. The structure includes an administration arrangement issuing the certificates to the end users. One such phone system exists under the trade name SKYPE™.

In order to use such a phone system, each user terminal installs client software for making calls. A user terminal can for example be a personal computer (PC). The client software itself is not principally the subject of this invention and so is not described in detail herein. It is capable of receiving a phone number for an end user in a standardised format and implementing a call to that user. It also has a registry for holding user names and numbers, so that a name, instead of a number, can be used to instigate a call. To allow a user to use the client software, it causes a display of the personal computer to display various images with which a user can interact using a conventional user interface such as a keyboard or mouse and cursor arrangement. This includes the display of a dialpad with numbers by means of which a user can dial the number that he wishes to call.

The SKYPE peer-to-peer phone system is widely used, but some issues have arisen which are addressed herein to simplify use of the system for users, particularly but not exclusively new users. In particular, users can have a difficulty in selecting the correct format of numbers to dial using the dialpad. This is particularly the case when dialing International numbers, that is dialing to reach a user who is outside a country where the dialing user is located.

SUMMARY

According to one aspect of the invention there is provided a method for effecting a voice communication between user terminals connected via a communication network, the method comprising:
 displaying a menu of country options to a user;
 receiving a number in local form;
 recalling formatting rules for a destination country selected by the user from the country options;
 prepending to the number a country prefix for the destination country in accordance with the formatting rules to generate a formatted number; and
 supplying the formatted number to a client installed at the user terminal for effecting the voice communication using the formatted number.

Another aspect of the invention provides a predictive dialer component comprising program code elements which, when executed by a computer, implement the following steps:
 displaying a menu of country options to a user;
 receiving a number in local form;
 recalling formatting rules for a destination country selected from the country options;
 prepending to the number a country prefix for the destination country in accordance with the formatting rules to generate a formatted number; and
 supplying the formatted number to a client installed at the user terminal for effecting the voice communication using the formatted number.

A further aspect of the invention provides a computer terminal for effecting a voice communication via a communication network, the computer terminal comprising:
 a processor arranged to execute a predictive dialer component and a client;
 a user interface;
 a display; and
 a store for holding formatting rules for a plurality of countries and wherein the user interface is arranged to allow a user to enter a number in local form, and wherein the predictive dialer component comprises program code elements which when executed display on the display a menu of country options to a user, recall formatting rules for a destination country selected by a user from the store, append to the number a country prefix for the country of destination in accordance with said formatting rules to generate a formatted number and supply the formatted number to the client for effecting the voice communication using the formatted number.

A further aspect of the invention provides a method of using a computer terminal to effect a voice communication over a communication network comprising:
 selecting from a menu of country options displayed to a user a destination country for the communication;
 entering a local number using an input means of the computer terminal; and instigating the voice communication by actuating a call button displayed to a user on the computer terminal.

A further aspect of the invention provides a method of effecting a voice communication between user terminals connected in a communication network comprising:
 displaying to a user an icon representing a default country;
 receiving a local number;
 prepending the country prefix of a default country to the local number to generate a formatted number; and
 supplying the formatted number to a client for instigating the communication.

BRIEF DESCRIPTION OF THE DRAWINGS

For a better understanding of the present invention and to show how the same may be carried into effect, reference will now be made by way of example to the accompanying drawings.

FIG. 11 illustrates the layout of a country database;

DETAILED DESCRIPTION

Figure 1:
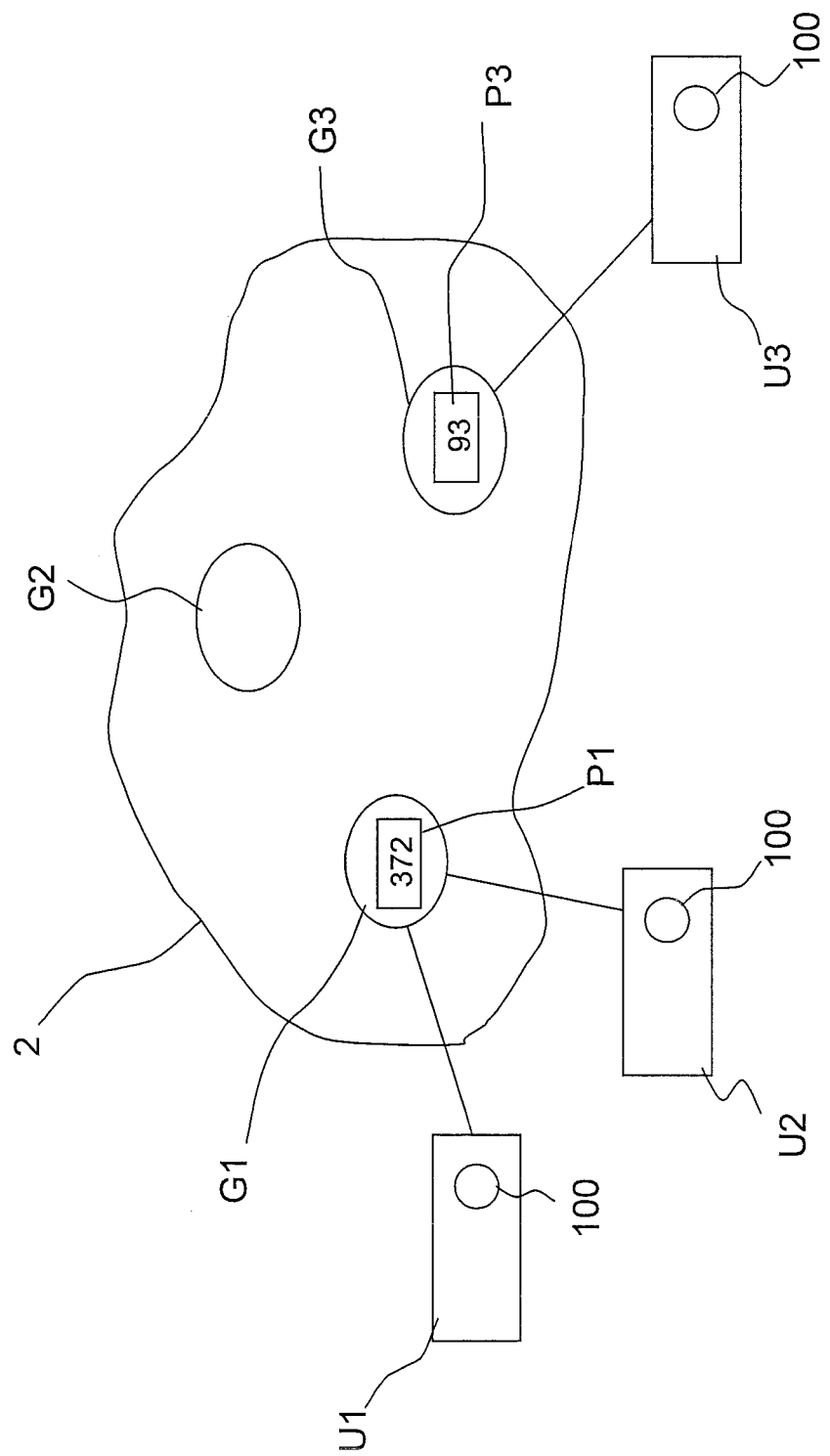
FIG. 1 is a schematic diagram of user terminals communicating via a communication network.

FIG. 1 is a schematic block diagram illustrating aspects of a peer-to-peer telephone system relevant to the present dialing arrangements. Reference numeral 2 denotes a world wide network such as the world wide web or internet. Although the network is itself not country specific and in fact crosses country boundaries without necessarily recognising them as such, as far as effecting communication over a phone network (such as the public switched telephone network (PSTN) or mobile networks) is concerned, it is considered to encompass a plurality of GEO zones G1, G2, G3, etc. Only three GEO zones are shown for the sake of clarity, but it will be appreciated that there are a large number of such GEO zones in the world. Each GEO zone represents a country and is associated with an appropriate country prefix P1, P2. In FIG. 1, the GEO zone G1 is shown associated with Estonia for which the country prefix P1 is 372. The GEO zone G3 is shown associated with Afghanistan for which the country prefix P3 is 93. Reference numerals U1, U2 and U3 denote users of the phone system and in particular user terminals such as personal computers PCs. Users U1 and U2 are shown communicating via the GEO zone G1 which we will refer to herein as the home country (in the example discussed herein this is Estonia). The user U3 is shown located in an overseas country, in this case Afghanistan. On each user terminal is installed client software 100 which implements the functionality discussed herein to effect calls to allow voice communication to be effected. The communication is in the form of voice over internet protocol (VoIP) or any other suitable protocol and includes video, chat, messaging, and other forms of real-time communications.

Figure 2:
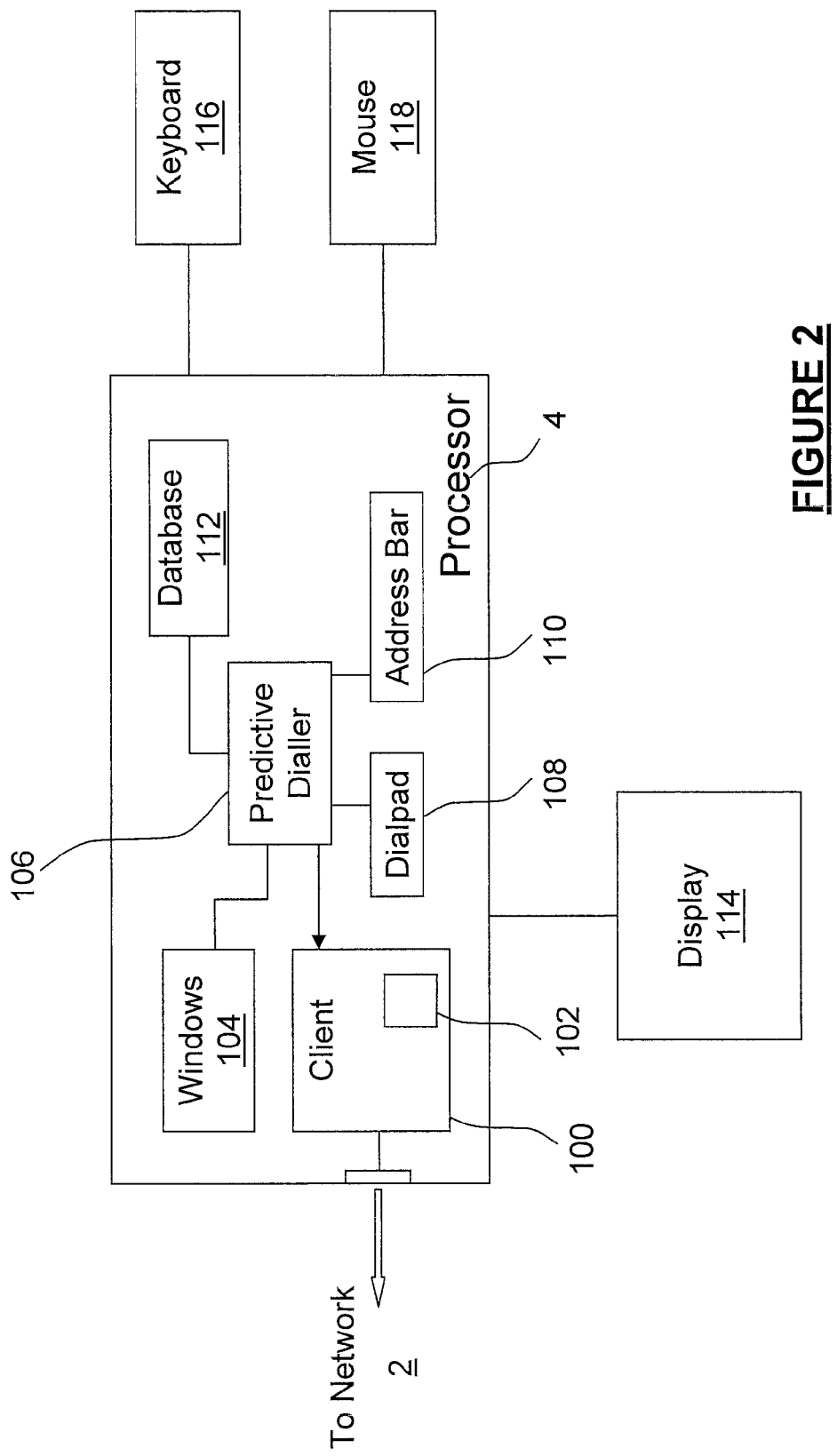
FIG. 2 is a schematic block diagram of components at a user terminal.

FIG. 2 is a schematic block diagram of components at the user terminal U1, U2, U3. As in FIG. 1, reference numeral 100 denotes the calling client software. The client software includes settings 102 which incorporate a user's profile country. The user terminal also has applications software 104, for example Windows which has its own country registry settings. Reference numeral 106 denotes a predictive dialer component which is associated with a dialpad wizard 108 and an addressbar 110. The client 100, applications software 104, predictive dialer 106, dialpad wizard 108 and addressbar 110 are all software components executed by a suitable processor 4 at the user terminal. A database 112 holds formatting rules and symbols for a plurality of countries. There is a display 114 which shows the screens of subsequent figures to a user. Reference numeral 116 denotes a user interface which is in the form of a keyboard, and reference numeral 118 denotes a display interface such as a mouse and cursor arrangement which allows a user to interact with the screen in a known way.

An aspect of the invention allows an internet voice application to behave as a local phone. This can be accomplished using predictive dialer 106 with the dialpad wizard 108 or with the addressbar 110. The dialpad wizard will be described first.

Figure 3:
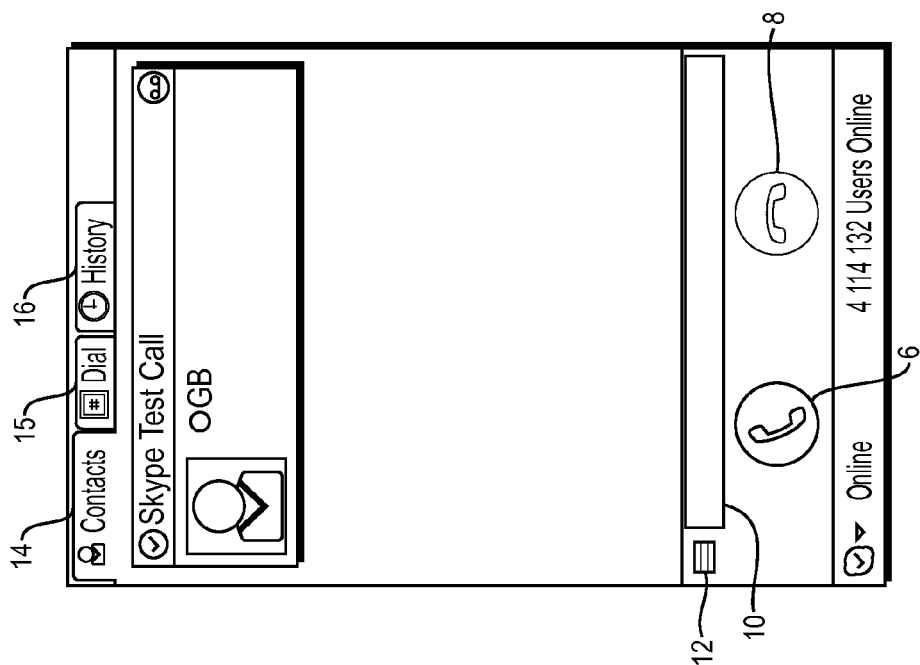

FIG. 3 is a screen print showing the display launched by the wizard 108 when the user first launches the client software 100 to make a phone call. The display shows a call button 6 and an end call button 8 and includes a field 10 in which the number to be called by the client software 100 is displayed. Next to this field is the image of a country icon 12 representing the local country, in this case the Estonian flag. The client software 100 detects the country in which the user terminal is located either using the country settings of the application software 104 or the profile settings 102 in the client software 100. The display also has three tabs, a contacts tab 14, a dial tab 15 and a history tab 16.

Figure 4:
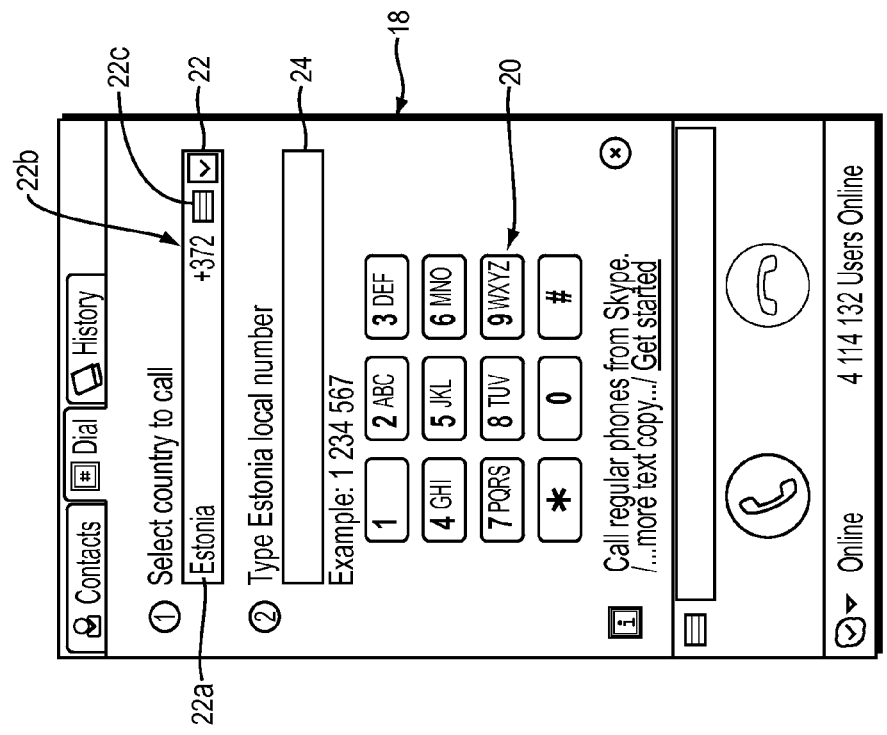
FIGS. 3 to 10 are screen shots illustrating operation of a predictive dialer component.

FIG. 4 illustrates the effect of a user actuating the dial tab 15 to select the dial screen 18. The dial screen shows the call button 6, end call button 8, number field 10 and country icon 12 as before. In addition, it displays a dialing keypad 20, a field 22 for displaying the country in which the user to be called is located and a field 24 which displays the number entered at the keypad 20. The field 22 holds a country name 22a, a country prefix 22b and a country icon 22c.

Figure 6:
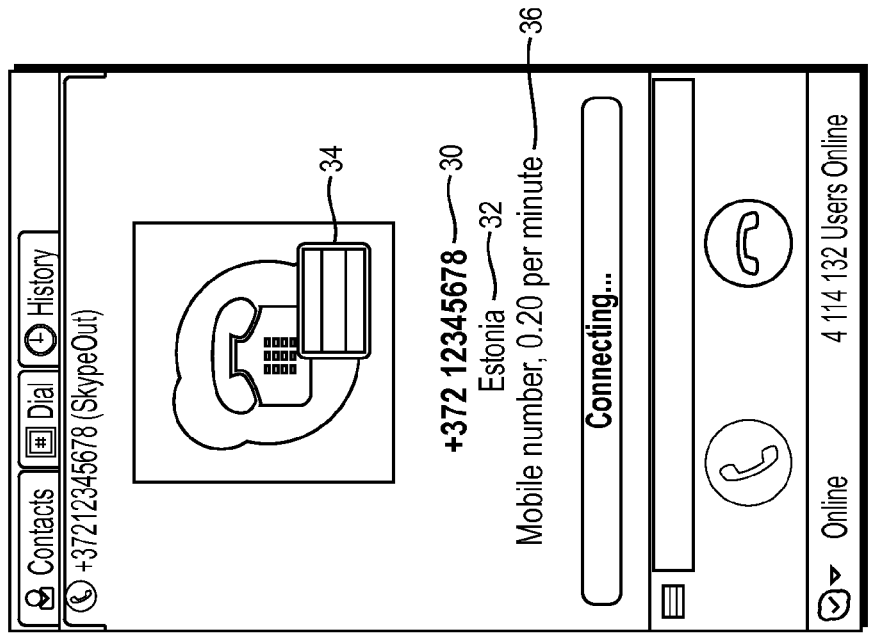
Figure 5:
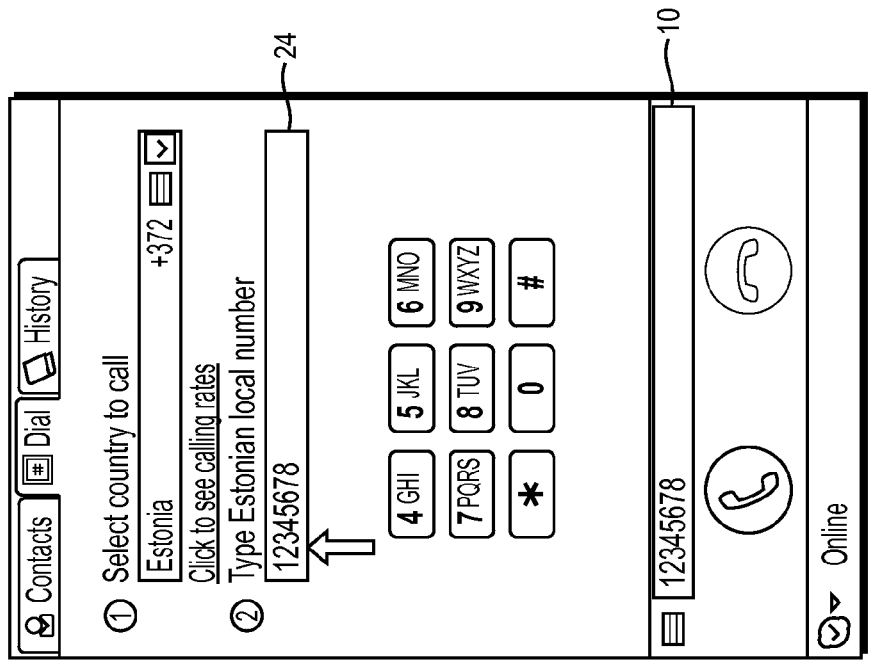

In order to make a local call, the user types in a local number, either using the display interface 118 to actuate the correct buttons on the displayed keyboard 20, or using the keyboard 116. As shown in FIG. 5, this is displayed in the field 24 and also in field 10. In this case the call that is being made is from one user terminal U1 in Estonia to another user terminal U2 in Estonia. The user need only enter the Estonian local number as shown in FIG. 5. However, in order to make the call the predictive dialer 106 adds the country prefix for Estonia, 372, together with the International dialing sign +, and supplies the formatted number to the client 100. FIG. 6 illustrates the screen showing the number 30 in the form in which it is dialed by the client software 100 after the user has clicked on the call button 6. In addition to showing the number, the display also shows the country name 32, the country icon 34 and the rate for the call 36. The rate is the cost per minute of the call and is dependent on the number which is being called.

Figure 8:
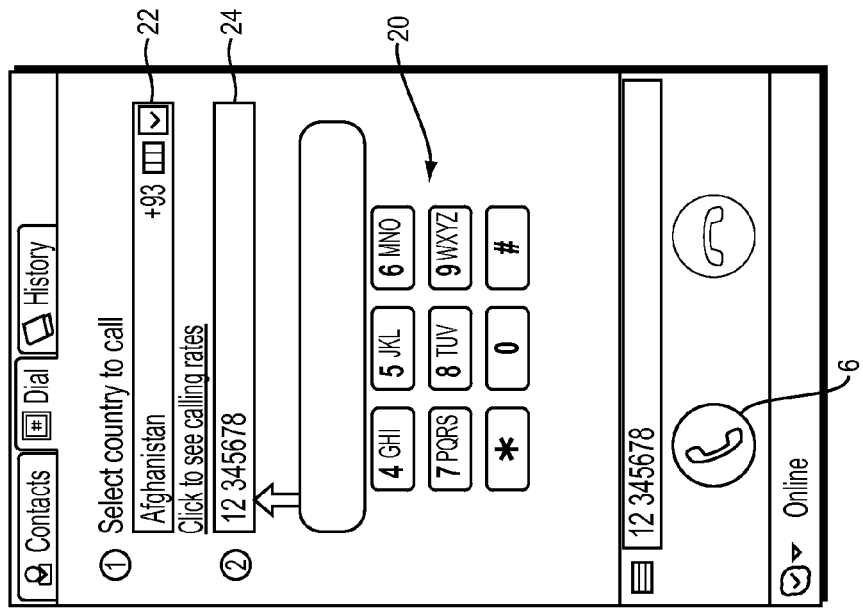
Figure 7:
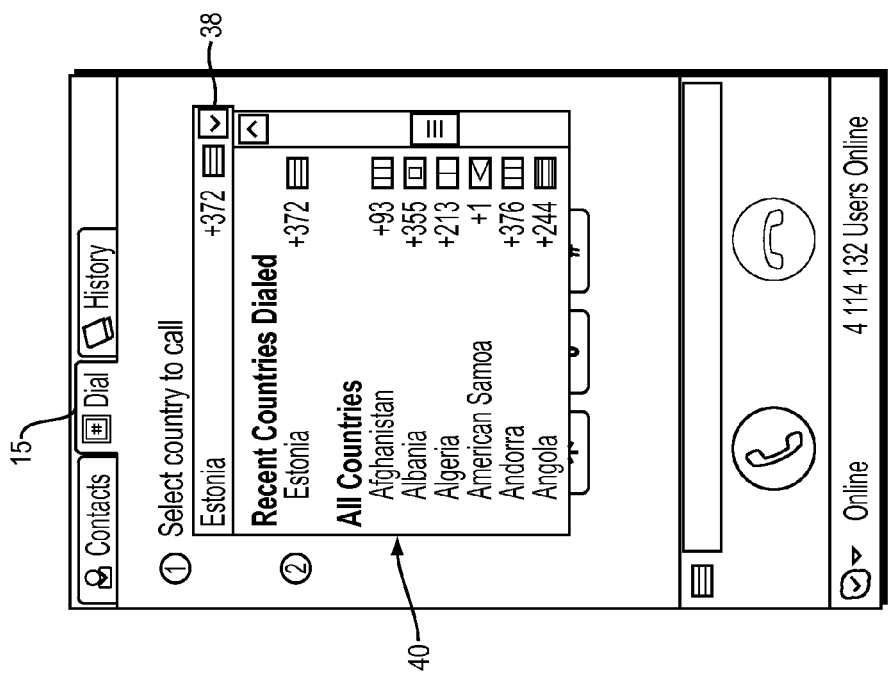
Figure 10:
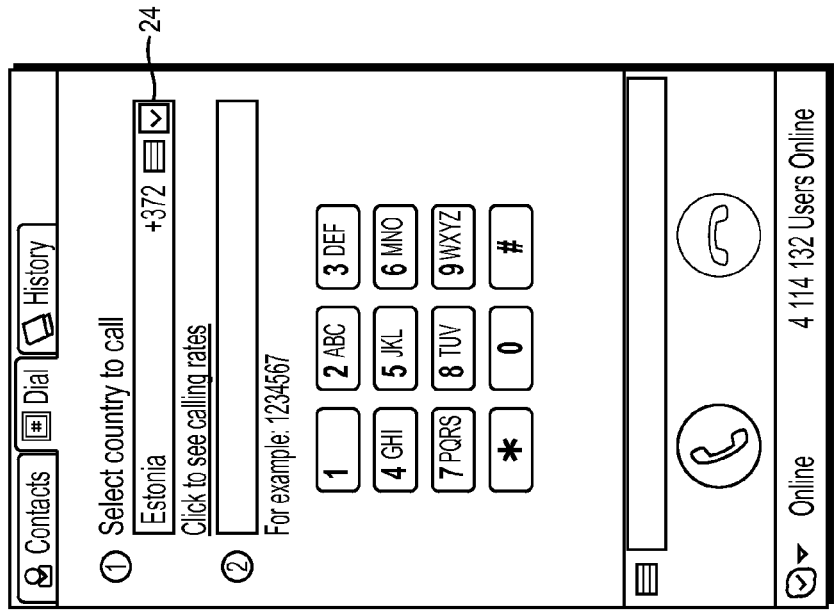
Figure 9:
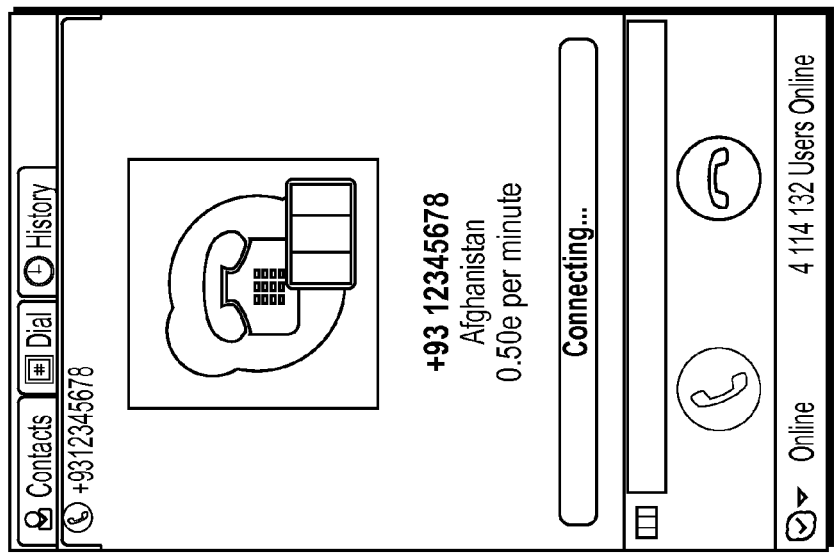

FIG. 7 illustrates a screen when a user wishes to dial an International number, that is for example to make a call from Estonia to Afghanistan. When a menu tab 38 in the field 22 is activated by a user, the screen displays a menu in the form of a list 40 of countries associated with their country icons and country prefixes. The user can scroll through the list in a known way. Assume that the user selects Afghanistan then FIG. 8 illustrates the screen with the country Afghanistan now displayed in the field 22. The user again types into the field 24 the local number using the dialpad 20 and then clicks on the call button 6. FIG. 9 illustrates the screen as the call is being made which shows the number which has been dialed including the appropriate country prefix for Afghanistan (+93), the country name and the rate. After the call, the country is automatically set back to the home country, in this case Estonia, as shown in field 24 in FIG. 10.

In order to append the correct prefix, the predictive dialer component recalls formatting rules from the database which holds relevant information for each country in the form of a table. A table could be held in an XML file or other resource. The format of the table is shown in FIG. 11. In the table of FIG. 11, each country name is associated with a number of data elements. The prefix is the country code. The area code minimum digits is the minimum number of digits allowed in an area code for the country. The area code maximum digits is the maximum number of digits allowed for an area code in the country. Subscriber minimum digits is the minimum number of digits in a subscribed number for that country. The subscriber maximum digits is the maximum number of digits in the subscriber number for that country. The country icon field holds an icon for the country in the form of a country flag. The table also indicates whether there are any characters to be removed (usually zero) before prepending the country prefix. It will be appreciated that the database could alternatively be located at a remote server to which the user terminal has access.

The database also holds rate information for calls, the rate depending on the number being called.

The functionality which has been described above is provided by the dialpad wizard (108) in combination with a predictive dialer component 106. The dialpad wizard is used to initiate PSTN (public switched telephone network) communication by selecting a country code and a local number.

The addressbar 110 is a tool that provides a similar but not identical functionality. The addressbar can be used to initiate a PSTN communication (by inputting a complete phone number, country code plus local number, or a local number only if the default country can be assumed), an internet protocol voice communication, or an instant messaging chat communication. The address bar is suitable for more sophisticated users of the peer-to-peer system, and can be used as a local phone when the default country is assumed.

When the default country is achieved, and a user enters the international calling sign "+" and a country code, e.g. 72 (Russia) the predictive dialer component automatically enter the global mode, and the country?? charges, in this case from Estonia to Russia.

Figure 12:
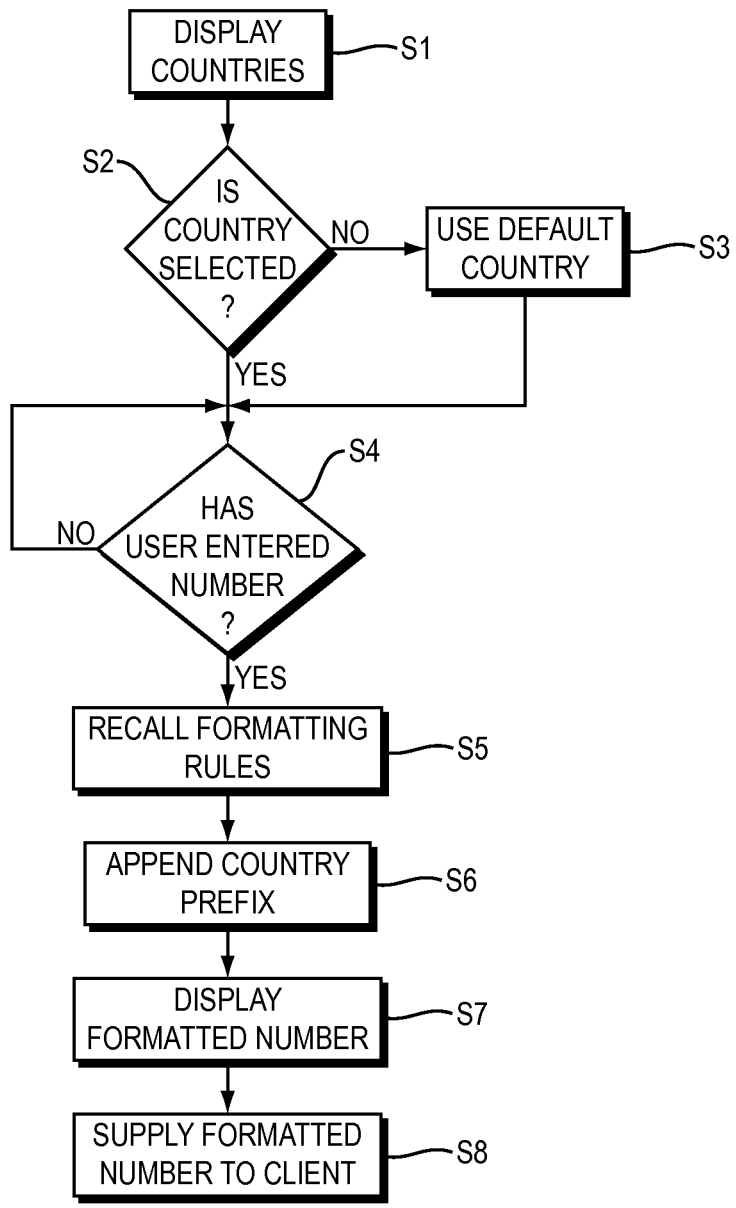
FIG. 12 is a flowchart illustrating the steps carried out by a predictive dialer component.

FIG. 12 is a flow chart illustrating the steps implemented by the predictive dialer component to provide a suitably formatted number to the client software 100 for making a call. At step S1, the menu of country options is displayed to the user using the drop-down menu 40 shown in FIG. 7. At step S2, it is checked whether or not a user has selected a country. If no country is selected, at step S3 a default country is selected. The default country is detected as described above. At step S4 it is checked whether or not a user has entered a phone number. This number is entered in local form. When the user has entered the number, at step S5 formatting rules are recalled from the database 112 for the selected country. At step S6, the correct country prefix is appended to the number, and any characters which need to be removed as shown in the formatting rules is removed. The result is a correctly formatted number which can be displayed to the user at step S7 and supplied to the client software 100 at step S8.

Figure 13:
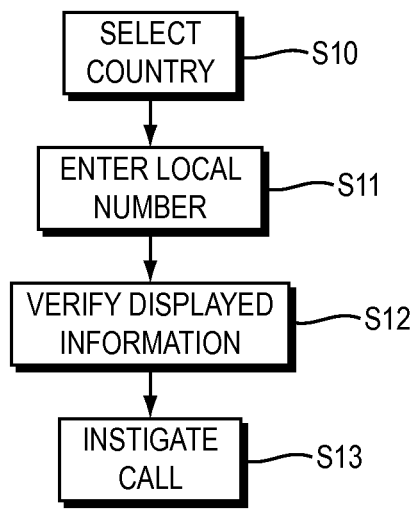
FIG. 13 is a flowchart illustrating steps taken by a user to use a computer terminal to effect a voice communication.

FIG. 13 is a flow chart illustrating the sequence of steps to be taken by a user for effecting a voice communication using the user terminal. At step S12 a user checks the format of the number being dialed. At step S10, the user selects from a menu of user options a destination country for the communication. At step S11, the user enters a local number using the user interface, in this case using the dialpad which is displayed to the user. At step S13, voice communication is instigated by clicking on the call button displayed to a user on the computer terminal.

The invention claimed is:

1. A method for effecting a voice communication between a first user terminal and a second user terminal connected via a communication network, the method comprising:
    displaying a dialing screen in a user interface, the dialing screen comprising a country icon for a destination country, a keypad for dialing, and a display field;
    responsive to a user input to the keypad, receiving a number in local form at the first user terminal;
    recalling formatting rules for the destination country selected by the user;
    prepending to the number a country prefix for the destination country in accordance with the formatting rules to generate a formatted number;
    supplying the formatted number to a client installed at the first user terminal for effecting the voice communication using the formatted number.

2. The method of claim 1, wherein the country icon is a country flag.

3. The method of claim 1, wherein the country flag is the country flag of the destination country.

4. The method of claim 1, the dialing screen further comprising a call button effective to initiate the voice communication, and tabs effective to access additional calling-related screens in the user interface.

5. The method of claim 4, the user interface further comprising a call history screen and a contacts screen, the call history screen and the contacts screen being accessible by selecting a corresponding one of the tabs.

6. The method of claim 4, wherein the dialing screen is displayed in response to the selection of a corresponding one of the tabs.

7. The method of claim 1, wherein the country icon to be displayed is selected based on a selected country in a setting in a profile or the client.

8. The method of claim 7, wherein the country prefix is displayed in the display field based on the selected country.

9. The method of claim 1, further comprising:
    responsive to a user input to select the destination country, displaying a list of countries, each country in the list comprising a country name, the country icon associated with the country name, and the country prefix associated with the country name.

10. A predictive dialer component of a user terminal for effecting a voice communication via a communication network, the predictive dialer component comprising instructions executable to perform operations comprising:
    displaying a dialing screen in a user interface, the dialing screen comprising a country icon for a destination country, a keypad for dialing, and a display field;
    responsive to a user input to the keypad, receiving a number in local form;
    recalling formatting rules for the selected destination country;
    prepending to the number a country prefix for the destination country in accordance with the formatting rules to generate a formatted number;
    supplying the formatted number to a client installed at the user terminal for effecting the voice communication using the formatted number.

11. The predictive dialer component of claim 10, wherein the country icon is a country flag of the destination country, and wherein the country icon and the country prefix to be displayed is selected based on a selected country in a profile or the client.

12. A user terminal for effecting a voice communication with a second user terminal connected via a communication network, the user terminal configured to perform operations comprising:
    displaying a dialing screen in a user interface, the dialing screen comprising a country icon for a destination country, a keypad for dialing, and a display field;
    responsive to a user input to the keypad, receiving a number in local form at the user terminal;
    recalling formatting rules for the destination country selected by the user;

prepending to the number a country prefix for the destination country in accordance with the formatting rules to generate a formatted number;

supplying the formatted number to a client installed at the user terminal for effecting the voice communication using the formatted number.

13. The user terminal of claim 12, wherein the country icon is a country flag.

14. The user terminal of claim 13, wherein the country flag is the country flag of the destination country.

15. The user terminal of claim 12, the dialing screen further comprising a call button effective to initiate the voice communication, and tabs effective to access additional calling-related screens in the user interface.

16. The user terminal of claim 15, the user interface further comprising a call history screen and a contacts screen, the call history screen and the contacts screen being accessible by selecting a corresponding one of the tabs.

17. The user terminal of claim 15, wherein the dialing screen is displayed in response to the selection of a corresponding one of the tabs.

18. The user terminal of claim 12, wherein the country icon to be displayed is selected based on a selected country in a setting in a profile or the client.

19. The user terminal of claim 18, wherein the country prefix is displayed in the display field based on the selected country.

20. The user terminal of claim 12, further configured to perform:

responsive to a user input to select the destination country, displaying a list of countries, each country in the list comprising a country name, the country icon associated with the country name, and the country prefix associated with the country name.

* * * * *